(12) United States Patent
Iwamoto et al.

(10) Patent No.: US 7,336,903 B2
(45) Date of Patent: Feb. 26, 2008

(54) OPTICAL WIRELESS TRANSMISSION APPARATUS

(75) Inventors: Takashi Iwamoto, Yokohama (JP); Manabu Sakane, Yokohama (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 594 days.

(21) Appl. No.: 10/815,787

(22) Filed: Apr. 2, 2004

(65) Prior Publication Data

US 2004/0197098 A1    Oct. 7, 2004

(30) Foreign Application Priority Data

Apr. 7, 2003    (JP)    ............ P2003-103339

(51) Int. Cl.
 *H04B 10/00*    (2006.01)
(52) U.S. Cl. ........................... 398/129; 398/32
(58) Field of Classification Search ........ 398/127–131, 398/32, 122, 123
See application file for complete search history.

(56) References Cited

U.S. PATENT DOCUMENTS

| | | | |
|---|---|---|---|
| 3,790,277 A * | 2/1974 | Hogan | ................... 356/139.06 |
| 6,091,528 A * | 7/2000 | Kanda | ......................... 398/122 |
| 6,616,352 B1 * | 9/2003 | Shigeta et al. | ............... 398/156 |
| 6,870,871 B2 * | 3/2005 | Yoshida et al. | ........... 372/49.01 |
| 7,194,209 B1 * | 3/2007 | Robbins et al. | ............. 398/127 |
| 2004/0208595 A1 * | 10/2004 | Mok et al. | ................... 398/128 |

FOREIGN PATENT DOCUMENTS

| | | |
|---|---|---|
| JP | 58-200646 | 11/1983 |
| JP | 06-029930 | 2/1994 |
| JP | 06-224858 | 8/1994 |
| JP | 08-051400 | 2/1996 |
| JP | 2001-326608 | 11/2001 |

* cited by examiner

*Primary Examiner*—Christina Leung
(74) *Attorney, Agent, or Firm*—The Nath Law Group; Jerald L. Meyer; Stanley N. Protigal

(57) ABSTRACT

There is disclosed an optical wireless transmission apparatus in which a pilot light emitting section of a receiving/emitting section sends a pilot light in a wavelength region of 930 nm to 960 nm to a target apparatus, and a light receiving device having a light receiving sensitivity only to the same wavelength region of 930 nm to 960 nm receives light sent from the target apparatus. When the pilot light in the wavelength region of 930 nm to 960 nm is used, the pilot light is not obstructed by sunlight, and therefore optical axis adjustment can be mutually and exactly performed by the use of the pilot light sent from the target apparatus.

1 Claim, 6 Drawing Sheets

OPTICAL WIRELESS TRANSMISSION APPARATUS

BACKGROUND OF THE INVENTION

1. Field of the Invention

The present invention relates to an optical wireless transmission apparatus which transmits/receives a light signal modulated by a data signal to transmit data.

2. Description of the Related Art

In an indoor optical wireless system in which a conventional optical wireless transmission apparatus is used, there has been a mainstream that one apparatus constituting the system automatically finds a target apparatus to communicate with the target apparatus. In this system, the apparatus receives light emitted from the target apparatus (hereinafter referred to as a pilot light) and detects a direction of the light to emit a transmission light in the direction. For example, as shown in FIG. 1, one apparatus (main apparatus 21) is provided with light emitting means 23 separately from a light emitting section 22 for transmitting a data signal, and the light emitting means 23 sends a pilot light 23A for optical axis adjustment. The other optical wireless transmission apparatus (sub-apparatus 24) displaces an optical axis direction of a light receiving device 24A to receive the pilot light 23A, and optical axes are adjusted based on a received light level of the pilot light 23A (see Japanese Patent No. 3059870).

Additionally, as a light for obstructing the pilot light sent for the optical axis adjustment, there are illuminations such as a fluorescent light. As a countermeasure against the fluorescent light, a filter for cutting a visible light is disposed, a modulated light is used as the pilot light, and a reception light is received at a frequency of the pilot light.

Moreover, there is also sunlight as the light which obstructs the pilot light. In general, a light in a near-infrared region, having a wavelength of around 850 nm, is used as the pilot light, but the sunlight is incomparably stronger than the light of the near-infrared region as compared with the fluorescent light. Therefore, when only the filter for cutting the visible light is disposed, the countermeasure against the sunlight is insufficient. The pilot light is easily obstructed by the sunlight in a situation where the sunlight is directly incident upon the inside of a room, and there has been a problem that it is difficult to exactly detect a position of the target apparatus from the pilot light emitted from the target apparatus.

SUMMARY OF THE INVENTION

An object of the present invention is to provide an optical wireless transmission apparatus capable of exactly detecting a position of a target apparatus from a pilot light emitted from the target apparatus even in a situation where sunlight is incident.

To achieve the object, there is provided an optical wireless transmission apparatus comprising: a light emitting section which emits a light signal toward a target apparatus; a light receiving section which receives the light signal emitted from the target apparatus; and a pilot light emitting section which emits a pilot light to the target apparatus, the pilot light emitted from the target apparatus being received by the light receiving section to detect an emission direction of the pilot light and to emit the light signal in the detected emission direction, wherein the pilot light emitting section emits the pilot light in a wavelength region of 930 nm to 960 nm, and the light receiving section comprises a light receiving device having a light receiving sensitivity only to the wavelength region of 930 nm to 960 nm.

In a preferable mode of the present invention, the light receiving device comprises: a light receiving layer formed of GaInAsP having a band gap energy corresponding to 960 nm; and a light absorbing layer formed of GaInAsP having a band gap energy corresponding to 930 nm, the layers being formed on an InP substrate.

Moreover, to achieve the object, there is provided an optical wireless transmission apparatus comprising: a transmission section which emits a light signal modulated by a data signal toward a target apparatus; a light receiving section which receives the light signal emitted from the target apparatus and which demodulates the light signal into the data signal; and a pilot light emitting section which emits a pilot light to the target apparatus, the pilot light emitted from the target apparatus being received by the light receiving section to detect an emission direction of the pilot light and to emit the light signal in the detected emission direction, wherein the pilot light emitting section emits the pilot light in a wavelength region of 930 nm to 960 nm, and the light receiving section comprises a filter which passes only a light in the wavelength region of 930 nm to 960 nm.

Furthermore, to achieve the object, there is provided an optical wireless transmission apparatus comprising: a transmission section which emits a light signal modulated by a data signal toward a target apparatus; a light receiving section which receives the light signal emitted from the target apparatus and which demodulates the light signal into the data signal; and a pilot light emitting section which emits a pilot light to the target apparatus, the pilot light emitted from the target apparatus being received by the light receiving section to detect an emission direction of the pilot light and to emit the light signal in the detected emission direction, wherein the pilot light emitting section emits the pilot light in a wavelength region of 930 nm to 960 nm, and the light receiving section comprises: a filter which passes only a light having a wavelength of 930 nm or more; and a light receiving device having a light receiving sensitivity only to a wavelength of 960 nm or less.

The nature, principle and utility of the invention will become more apparent from the following detailed description when read in conjunction with the accompanying drawings.

DESCRIPTION OF THE PREFERRED EMBODIMENTS

Embodiments of an optical wireless transmission apparatus according to the present invention will be described hereinafter with reference to the drawings.

Figure 2:
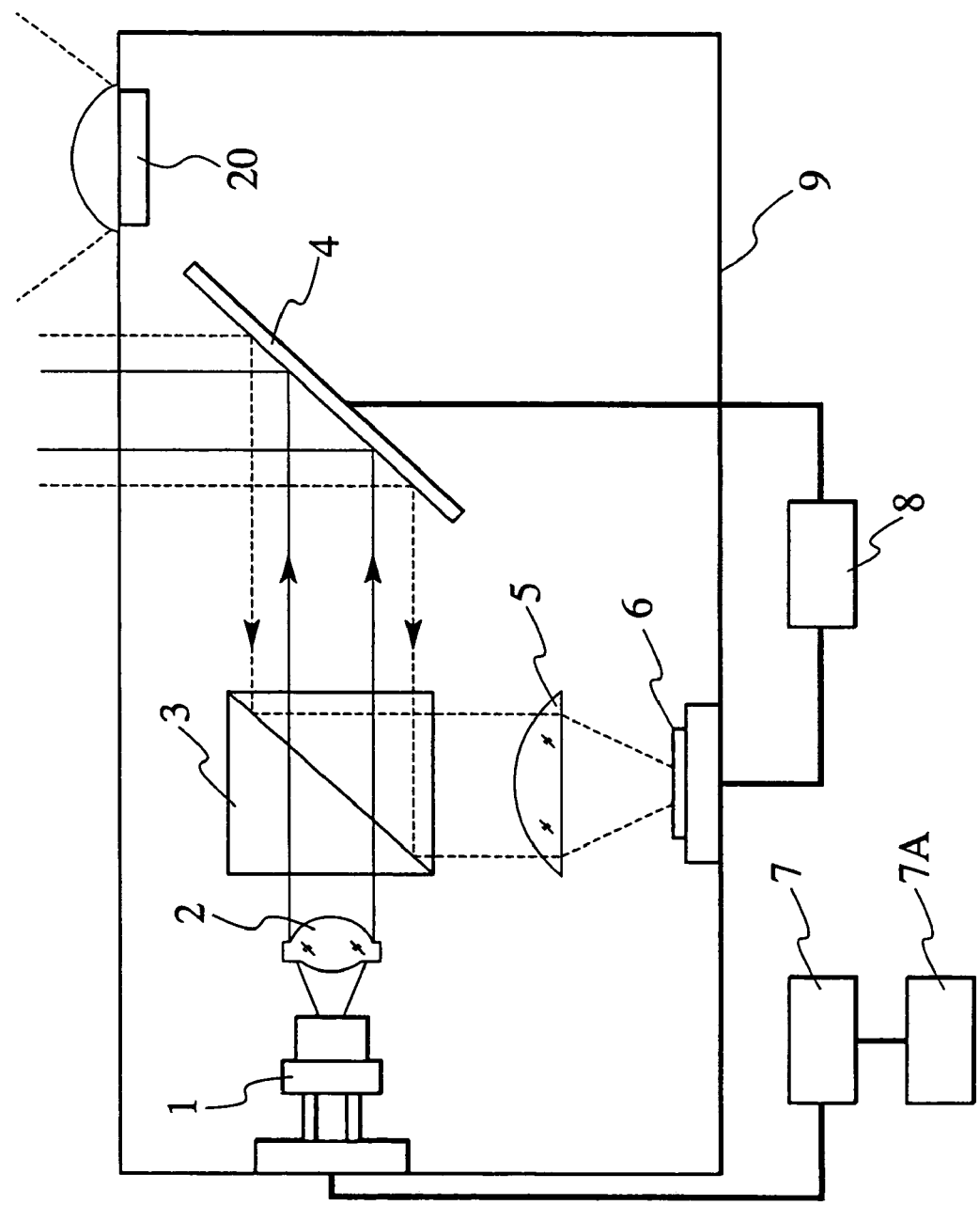
FIG. 2 is a schematic constitution diagram of an optical wireless transmission apparatus according to a first embodiment.

FIG. 2 is a schematic constitution diagram of the optical wireless transmission apparatus according to a first embodiment. A light receiving/emitting section 9 of the present apparatus includes: a light emitting device 1 which sends a light signal modulated by a data signal; a lens 2 including a collimator lens; a beam splitter 3 which is an optical device for splitting an incident light into a transmitted light and a reflected light; an optical reflection system 4 in which a deflection angle is variable by a driving section (not shown); a lens 5 on which parallel lights are focused; a light receiving device 6 which receives a transmission light or a pilot light sent from the target apparatus; and a pilot light emitting section 20 which sends the pilot light. The light receiving/emitting section 9 is further connected to a data supply section 7, an external interface 7A, and a deflection control signal supply section 8.

Among these components, the light emitting device 1, lens 2, beam splitter 3, and optical reflection system 4 function as a light emitting section which sends the light signal toward the target apparatus. The light receiving device 6, lens 5, beam splitter 3, and optical reflection system 4 function as a light receiving section which receives the pilot light sent from the target apparatus.

The light emitting device 1 emits the light signal modulated by the data signal. For example, a laser diode is usable as the light emitting device 1. An emitted beam of the laser diode is thin. When the emitted beams are shaped into approximately parallel beams by the lens 2, the beam splitter 3 and optical reflection system 4 are irradiated with the emitted light with high efficiency.

The pilot light emitting section 20 emits the light of a wavelength region of 930 nm to 960 nm as the pilot light for adjusting the optical axis with respect to the target apparatus (not shown) including the same constitution. As the device constituting the pilot light emitting section 20, a semiconductor laser of an end surface emitting type, a surface emitting laser, a light emitting diode and the like, which emit the light in the wavelength region of 930 nm to 960 nm, are usable.

The light receiving device 6 has a light receiving sensitivity only in the wavelength region of 930 nm to 960 nm. As the light receiving device 6, for example, a photodiode and the like are usable.

Figure 3:
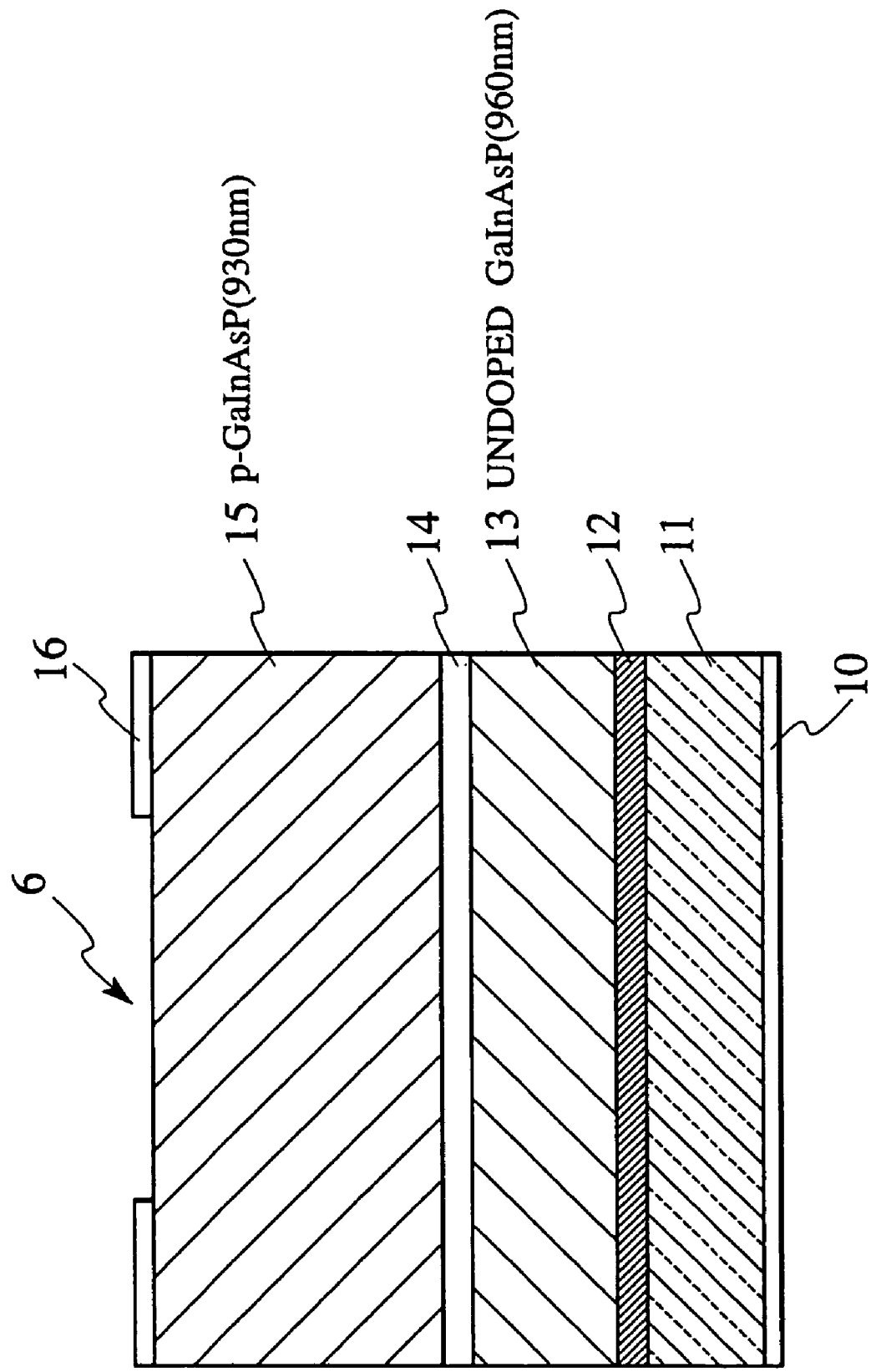
FIG. 3 is a schematic constitution diagram of a light receiving device.

FIG. 3 is a schematic constitution diagram of the light receiving device 6. For the light receiving device 6, an n-InP layer 12 of the same conductive type as that of an n-InP substrate 11 is grown on the substrate, and an undoped GaInAsP layer 13 having a band gap corresponding to 960 nm is grown in a predetermined thickness on the n-InP layer 12. Furthermore, a p-InP layer 14 is further grown, and a p-GaInAsP layer 15 having a band gap corresponding to 930 nm is grown in a predetermined thickness on the p-InP layer 14. An n-electrode 10 and p-electrode 16 are formed on and under the device. Since an electric field is applied only to the undoped GaInAsP layer 13 in the light receiving device 6 constituted in this manner, only the light absorbed by this layer constitutes a signal as a light current.

In the device constitution of FIG. 3, it is assumed that a light having a wavelength shorter than 930 nm is incident from above. In this case, since the light is absorbed by the p-GaInAsP layer 15 on the surface, the light does not reach the undoped GaInAsP layer 13, and any light current is not produced. Here, the p-InP layer 14 functions as a barrier so as to prevent a carrier generated by absorption from leaking to the undoped GaInAsP layer 13 which generates the light current. On the other hand, the light in the wavelength region of 930 nm to 960 nm is not absorbed by the upper layer, and is absorbed by the undoped GaInAsP layer 13 to constitute the light current. It is to be noted that the energy of light having a wavelength of 960 nm or more is smaller than the band gap energy of the undoped GaInAsP layer 13, and is not absorbed by the undoped GaInAsP layer 13, and any light current is not generated. Therefore, the light receiving device has a light receiving sensitivity only to the light in the wavelength region of 930 nm to 960 nm.

Moreover, in FIG. 3, the conductive types of the n-InP layer 12 and the p-InP layer 14 may be reversed.

Figure 4:
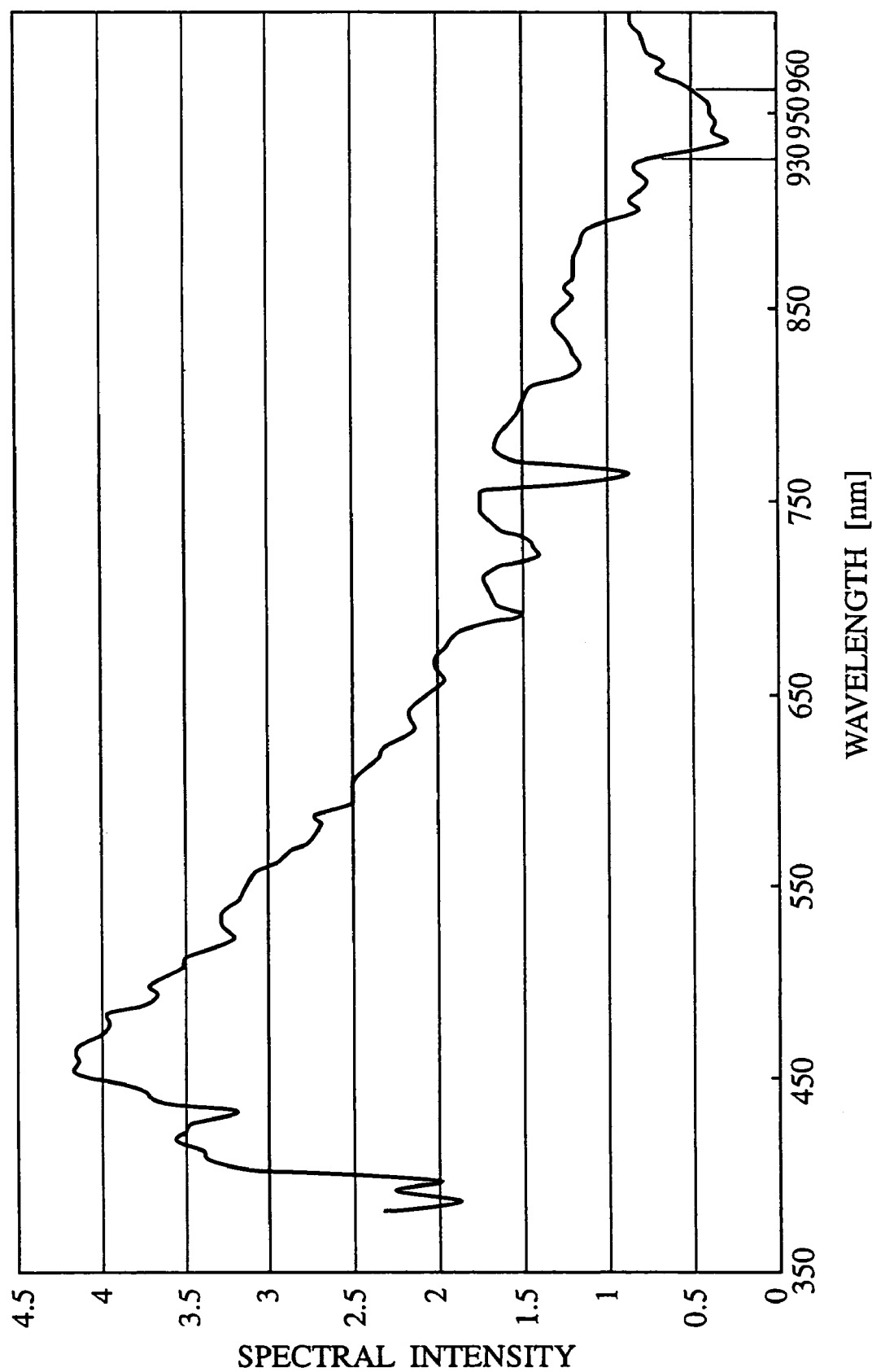
FIG. 4 is an explanatory view showing a relation between a spectral intensity and a wavelength of sunlight incident upon the inside of a room.

FIG. 4 is an explanatory view showing a relation between a spectral intensity and a wavelength of sunlight incident upon the inside of a room, the abscissa shows the spectral intensity, and the ordinate shows the wavelength (additionally, the spectral intensity is shown in an optional scale). As apparent from FIG. 4, there is a region where the spectral intensity is small by absorption of the light between the wavelengths 930 nm and 960 nm.

Therefore, when the light in the wavelength region of 930 nm to 960 nm is employed as the pilot light, and the light receiving device having the light receiving sensitivity only to the light in the wavelength region of 930 nm to 960 nm is used, an influence by sunlight can be reduced. Therefore, the pilot light can be received satisfactorily in a situation in which the sunlight is incident upon the inside of a room.

For the light receiving/emitting section 9 of FIG. 2, in the data supply section 7 to which the data signal has been supplied from the external interface 7A, the light signal whose intensity has been modulated by the supplied data signal is emitted from the light emitting device 1, and shaped into the approximately parallel beams by the lens 2. Thereafter, the light is passed through the beam splitter 3, reflected by the optical reflection system 4, and sent as a transmission light. A reception light received from the target apparatus (not shown) having the same constitution is reflected by the optical reflection system 4 and beam splitter 3, and converged by the light receiving device 6 via the lens 5. The received light is photoelectrically converted by the light receiving device 6, and output as position information of the target apparatus to the deflection control signal supply section 8.

Since the beam splitter 3 is capable of coaxially controlling the transmission and reception lights in the light receiving/emitting section 9, the optical axis of the light sent from the target apparatus (not shown) having the same constitution is matched with that of the light received by the present apparatus, and accordingly the target apparatus is irradiated with the transmission light of the present apparatus. The target apparatus similarly performs the optical axis adjustment, and is irradiated with the transmission light from the present apparatus, and the optical axes of the light receiving/emitting sections 9 of two apparatuses are matched.

Figure 5:
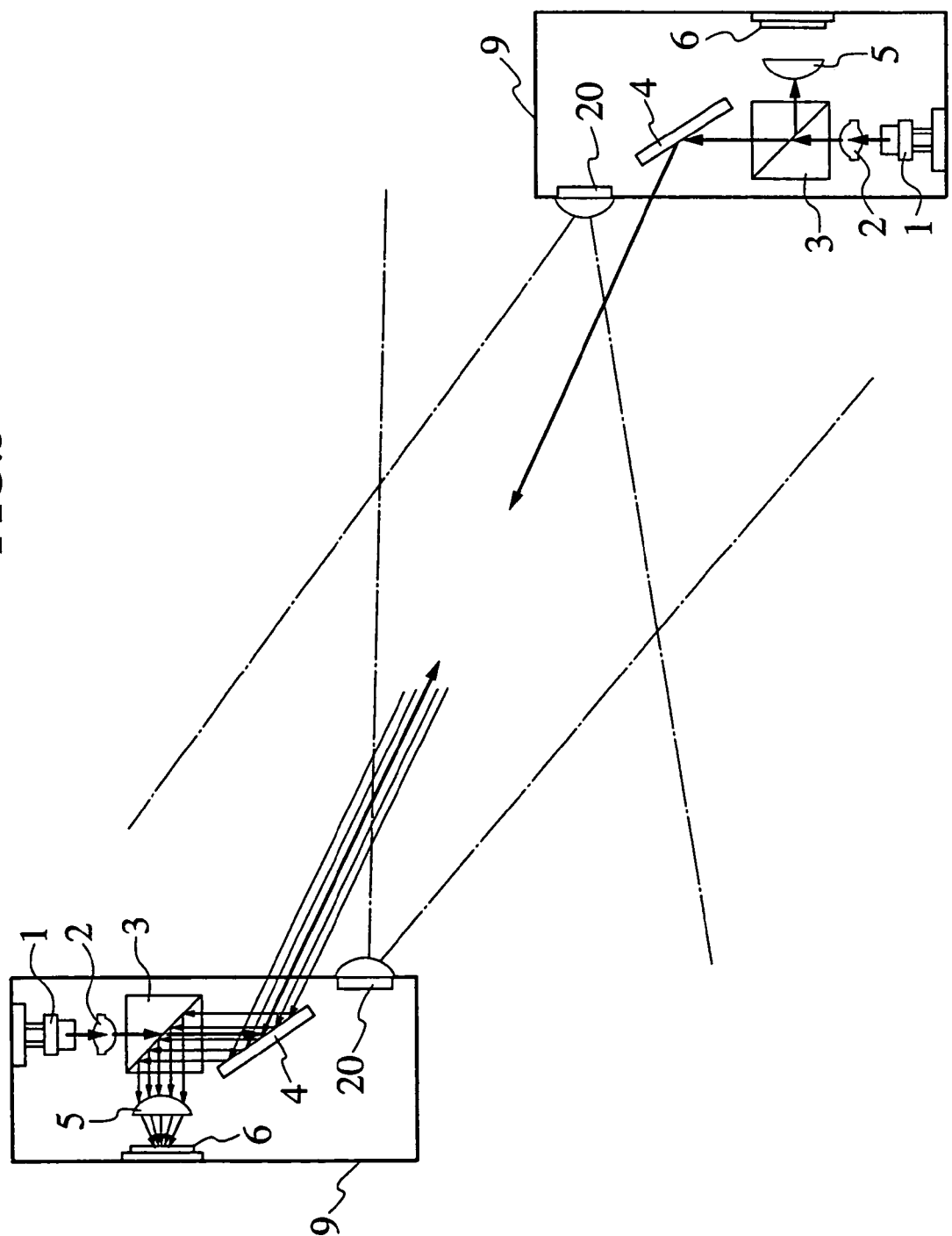
FIG. 5 is a schematic constitution diagram in a case where two optical wireless transmission apparatuses are combined to constitute the indoor optical wireless transmission system.

FIG. 5 is a schematic constitution diagram in a case where two optical wireless transmission apparatuses are combined to constitute the indoor optical wireless transmission system (components equivalent to those of FIG. 2 are denoted with the same reference numerals). As shown in FIG. 5, each pilot light emitting section 20 sends the pilot light over a broad range. The pilot light sent from the target apparatus having the same constitution is received by the light receiving device 6 via the optical reflection system 4, beam splitter 3, and lens 5 of the light receiving/emitting section 9, and information indicating presence/absence of the reception light, quantity of received light, light receiving direction or the like is output to the deflection control signal supply section 8. The deflection control signal supply section 8 calculates a direction and movement amount in moving the optical reflection system 4 so as to match the optical axis of the reception system of the present apparatus with that of the pilot light from the target apparatus based on position information obtained from the light receiving device 6, and accordingly a control signal for controlling a driving section (not shown) of the optical reflection system 4 is generated.

When the optical wireless transmission apparatuses according to the present embodiment are combined to construct the indoor optical wireless transmission system shown in FIG. 5, one apparatus sends the pilot light in the wavelength region of 930 nm to 960 nm, a target apparatus receives the light via the light receiving device having the light receiving sensitivity only to the same wavelength region as described above, and therefore the light in near-infrared region is not strongly influenced by sunlight. Therefore, the optical axis adjustment can be exactly performed between the apparatuses by the use of the pilot light sent from the target apparatus without obstructing the pilot light by the sunlight even in the situation where the sunlight is incident.

Since the beam splitter 3 is capable of coaxially controlling the transmission and reception lights in the light receiving/emitting section 9 of each optical wireless transmission apparatus, the optical axis of the pilot light sent from the target apparatus is matched with that of the light received by the present apparatus, and accordingly it is possible to perform high-precision bidirectional communication.

Figure 6:
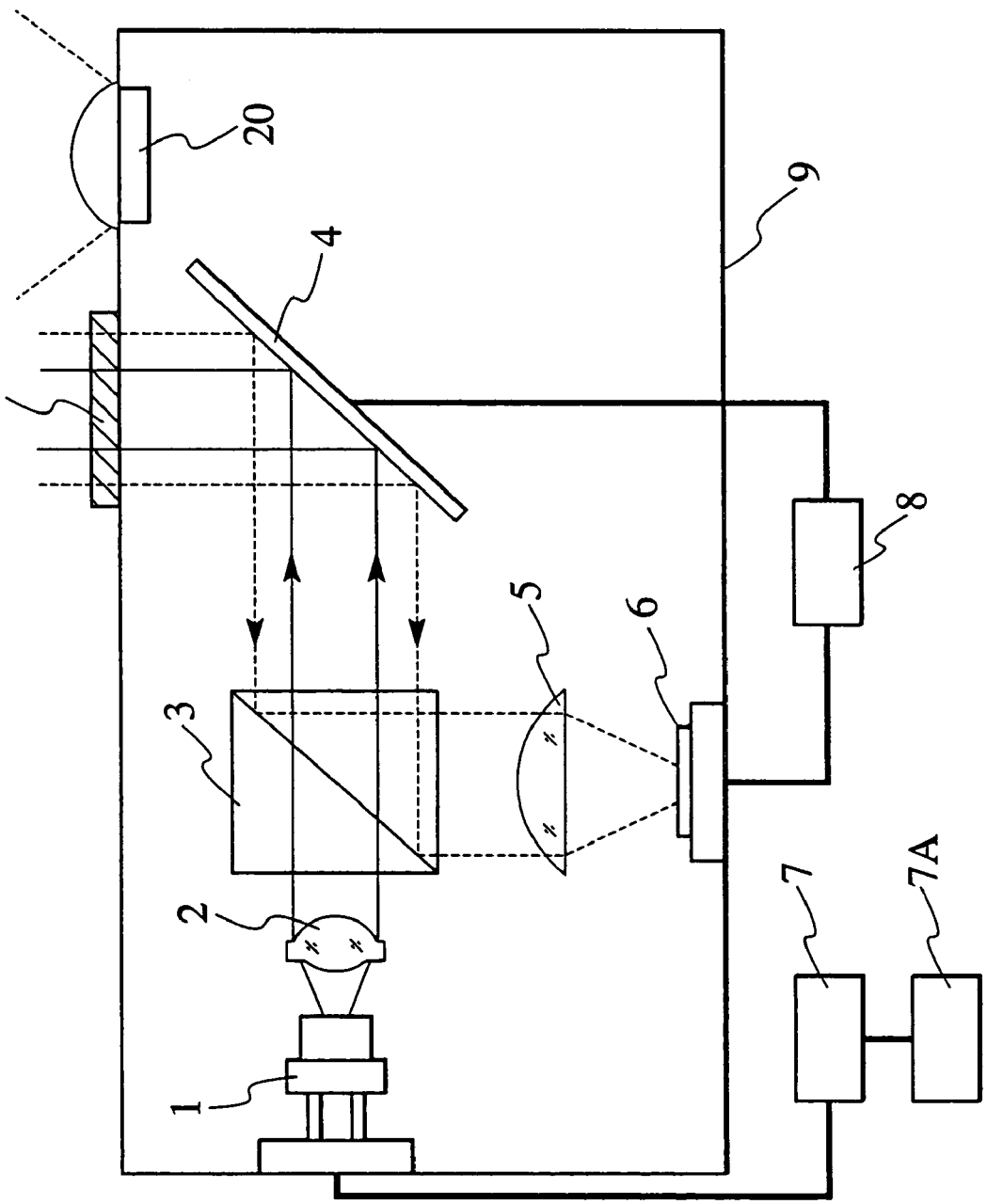
FIG. 6 is a schematic constitution diagram of the optical wireless transmission apparatus according to a second embodiment.

FIG. 6 is a schematic constitution diagram of the optical wireless transmission apparatus according to a second embodiment (components equivalent to those of FIG. 2 are denoted with the same reference numerals). In the present embodiment, a filter 30 which passes only the light in the wavelength region of 930 nm to 960 nm is disposed in a previous stage of the optical reflection system 4 upon which the transmission light and the pilot light from the target apparatus are incident. The pilot light emitting section 20 comprises a device which sends the light in the wavelength region of 930 nm to 960 nm in the same manner as in the first embodiment. On the other hand, the light receiving device 6 comprises a device having a light receiving sensitivity to a usually broad wavelength region.

According to the present embodiment, the transmission light and pilot light sent from the target apparatus pass through the filter 30 and reach the light receiving device 6, but sunlight including an intense light in the near-infrared region cannot pass through the filter 30, and therefore the pilot light is not obstructed by the sunlight. Therefore, when the optical wireless transmission apparatuses according to the present embodiment are combined to construct the indoor optical wireless transmission system shown in FIG. 5, the optical axis adjustment can mutually and exactly be performed by the use of the pilot light sent from the target apparatus. Since the device having the light receiving sensitivity to the usually broad wavelength range is usable as the light receiving device, cost reduction can be achieved by the use of common components.

Next, the optical wireless transmission apparatus according to a third embodiment will be described. It is to be noted that a basic constitution of the optical wireless transmission apparatus according to the present embodiment is the same as that of FIG. 6, and is therefore omitted from figures, and the corresponding part will be described using the same reference numerals as those in FIG. 6.

The present embodiment includes the filter 30 which passes only the light having a wavelength of 930 nm or more, and the light receiving device 6 having a light receiving sensitivity only to a wavelength range of 960 nm or less. The other constitution is the same as that of the second embodiment.

The transmission light and pilot light sent from the target apparatus pass through the filter 30 and reach the light receiving device 6, but a light having a wavelength up to 930 nm in the sunlight including the intense light in the near-infrared region cannot pass through the filter 30, and a light having a wavelength exceeding 960 nm is not received by the light receiving device 6. Therefore, as a result, only the light in the wavelength region of 930 nm to 960 nm is received by the light receiving device 6. Therefore, the pilot light is not disturbed by sunlight in the same manner as in the other embodiments. When the optical wireless transmission apparatuses of the present embodiment are combined to construct the indoor optical wireless transmission system shown in FIG. 5, the optical axis adjustment can mutually and exactly be performed by the use of the pilot light sent from the target apparatus.

Figure 1:
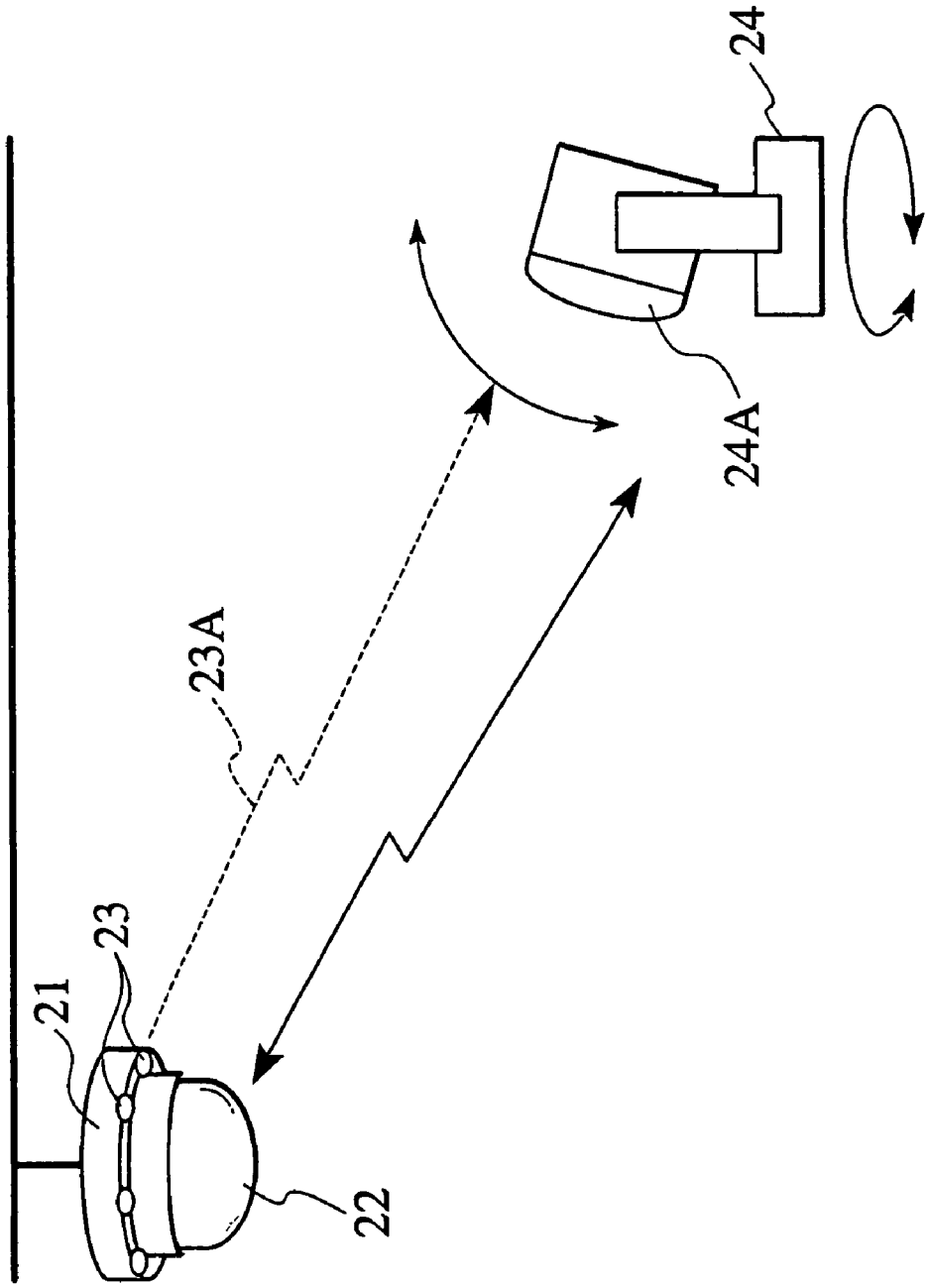
FIG. 1 is a schematic constitution diagram of an indoor optical wireless system in which a conventional optical wireless transmission apparatus is used.

It is to be noted that in the above-described embodiments, the example applied to the indoor optical wireless transmission system shown in FIG. 5 has been described, but the present invention is also applicable to a system comprising the main apparatus and the sub-apparatus as shown in FIG. 1.

Moreover, the present invention is not limited to the optical wireless transmission apparatus for performing the bidirectional communication shown in FIG. 5, and is usable as a one-directional optical wireless reception or transmission apparatus.

As described above, according to the optical wireless transmission apparatus of the present invention, since the optical axis adjustment is performed by the pilot light in the wavelength region of 930 nm to 960 nm, which is not influenced by sunlight. Therefore, the position of the target apparatus can exactly be detected from the pilot light emitted from the target apparatus even in the situation in which the sunlight is incident. Therefore, when the optical wireless transmission apparatuses according to the present invention are combined to construct the indoor optical wireless transmission system, the high-precision bidirectional communication can be achieved.

It should be understood that many modifications and adaptations of the invention will become apparent to those skilled in the art and it is intended to encompass such obvious modifications and changes in the scope of the claims appended hereto.

What is claimed is:

1. An optical wireless transmission apparatus comprising:
   a light emitting device that emits a data signal light obtained by modulating a data signal;
   a first lens that shapes the data signal light emitted from the light emitting device into approximately parallel beams;
   a beam splitter that reflects a part of an incoming light and transmits a remainder thereof;
   an optical reflection system having a reflection plate that reflects an incoming light and a driving section that changes a deflection angle of the reflection plate with respect to an axis of the incoming light;
   a second lens that condenses a data signal light and a pilot light transmitted from a target apparatus;

a light receiving device that receives the data signal light and the pilot light transmitted from the target apparatus and condensed by the second lens; and a pilot light emitting section provided ahead of the beam splitter and the optical reflection system and close to a path of the data signal light emitted from the light emitting device and reflected by the beam splitter and the data signal light and the pilot light transmitted from the target apparatus, the pilot light emitting section emitting the pilot signal toward the target apparatus, wherein the data signal light emitted from the light emitting device is shaped into approximately parallel beams by the first lens, transmitted through the beam splitter, reflected into a predetermined direction by the optical reflection system, and transmitted toward the target apparatus, the pilot light emitted from the pilot light emitting section is transmitted directly toward the target apparatus not via the beam splitter and the optical reflection system, and the data signal light and the pilot light transmitted from the target apparatus is reflected by the optical reflection system, reflected by the beam splitter, transmitted through the second lens, and received by the light receiving device, and wherein a wavelength region of the pilot light ranges from 930 nm to 960 nm and the light receiving device has a light receiving sensitivity only in a wavelength region of 930 nm to 960 nm, and wherein the light receiving device comprises: a light receiving layer formed of GaInAsP having a band gap energy corresponding to 960 nm on an InP substrate; and a light absorbing layer formed of GaInAsP having a band gap energy corresponding to 930 nm on the light receiving layer.

* * * * *